Sept. 4, 1962 J. L. ARBOGAST ET AL 3,052,837
PIPE FINDER
Filed Dec. 24, 1958 3 Sheets-Sheet 1
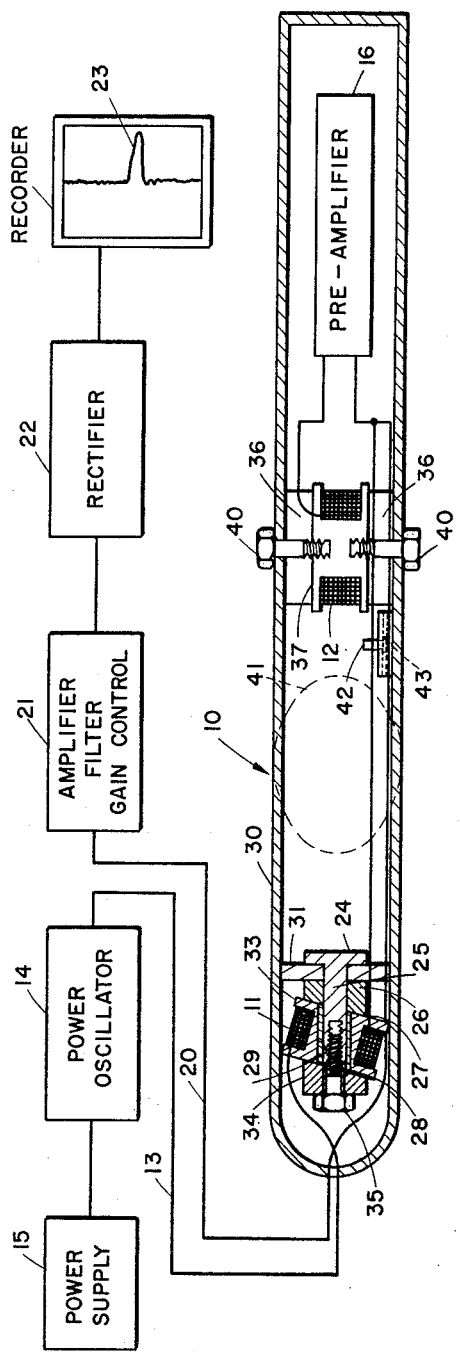
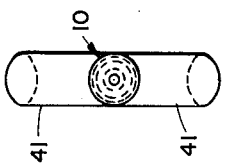
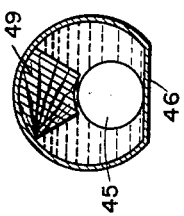
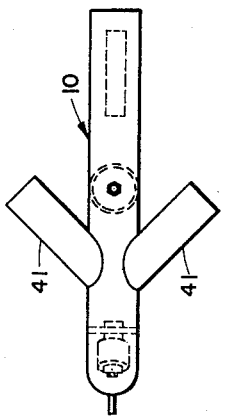
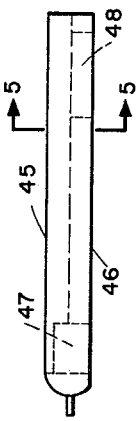
INVENTORS:
JAMES L. ARBOGAST
CHARLES H. FAY
BY: *James Todorrie*
THEIR ATTORNEY

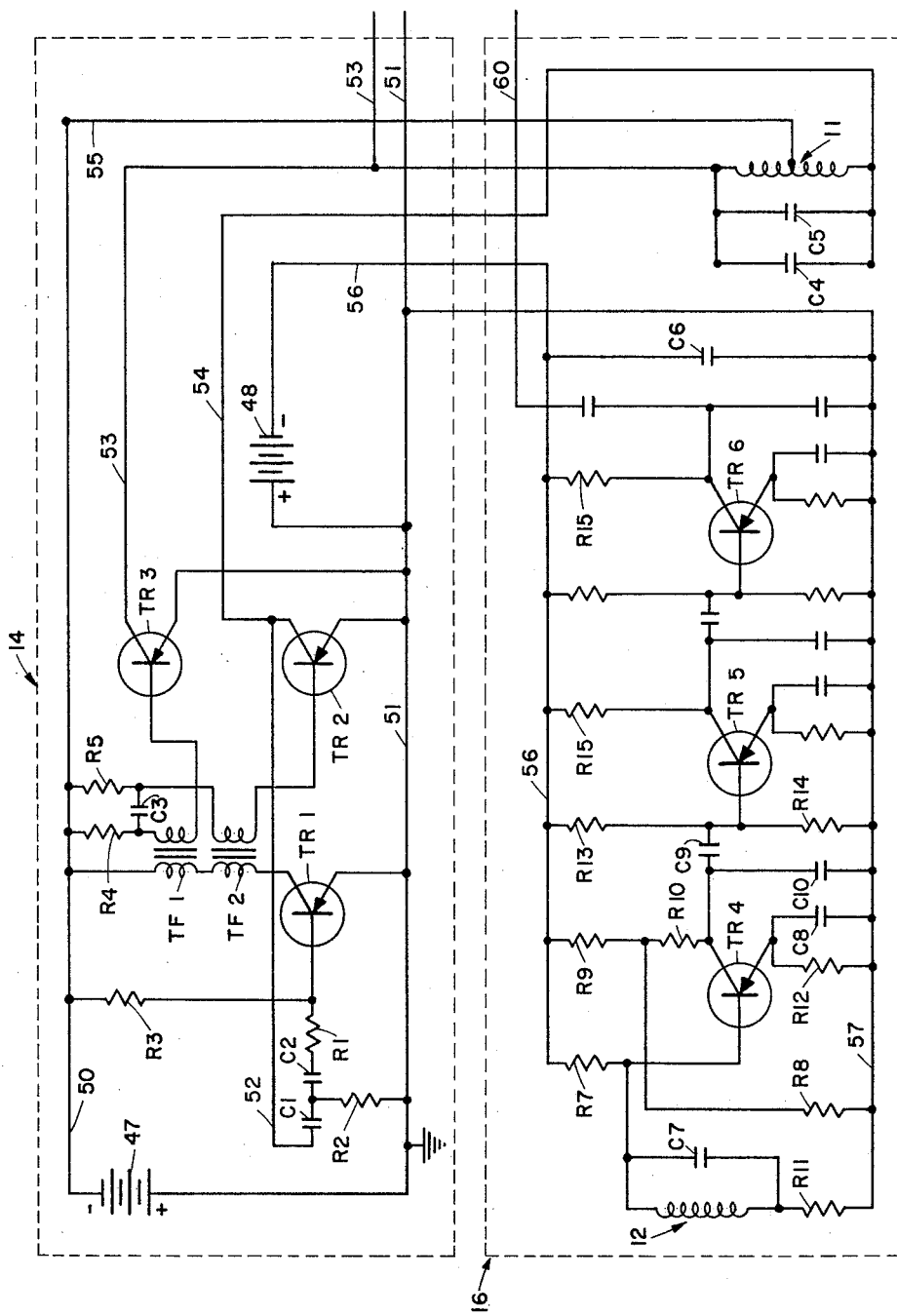

INVENTORS:
JAMES L. ARBOGAST
CHARLES H. FAY
BY: James Todorovic
THEIR ATTORNEY 3,052,837
PIPE FINDER
James L. Arbogast, Bellaire, and Charles H. Fay, Houston, Tex., assignors to Shell Oil Company, a corporation of Delaware
Filed Dec. 24, 1958, Ser. No. 782,924
1 Claim. (Cl. 324—3)

This invention pertains to oil field equipment and more particularly to an instrument and system for locating pipelines and other objects buried in the floor of a body of water.

In many cases particularly in the drilling of offshore oil wells it is necessary to locate ferrous metal objects such as pipelines and the like buried in the ocean floor. While the term "ocean floor" is used, this invention of course is useful for detecting ferrous metal objects buried in the floor of any body of water. It is the normal practice in offshore operations to bury pipelines on the order of three feet below the ocean floor in order to prevent physical damage to the pipelines by the ocean currents and the like. At various times it is necessary to locate these buried pipelines in order that repairs may be made or to avoid damage to them when new pipelines are installed. Also, in many cases valuable equipment falls overboard from an offshore drilling rig and some means must be provided for rapidly locating and retrieving this equipment. While equipment which falls overboard from an offshore drilling rig is not actually buried in many cases it sinks into the mud floor of the ocean and is substantially buried.

Many ferrous metal locators have been developed in the past for use in locating land mines and the like buried a slight distance below the surface of the earth or submerged in water. While these detectors are satisfactory for this purpose they are entirely unsatisfactory for locating ferrous metal objects such as, pipelines which are buried a few feet below the ocean floor. Prior art devices use relatively high frequency low power oscillators for supplying the alternating current to the detector as well as conventional voltage amplifiers for amplifying the detector signal. In prior devices operating on the mutual inductance principle in which a source coil and detector coil are mounted at right angles to each other it was customary to operate the source coil as the tank coil of the oscillator circuit. The operation of the source coil as the tank coil limits the amount of power which can be applied to the source coil, which in turn limits the range of the detector. Also in prior devices it is the usual practice to use iron core coils, which limits the effective range of the device due to the dependence of the coils on the permeability and the position of the iron core.

The probe moves in the region near the bottom sediments which are poor conductors compared to the water, particularly in respect to salt water, thus there is a nonsymmetrical distribution of conductivities around the probe. The nonsymmetrical distribution of conductivities redistributes the field around the source coil and contributes conductivity coupling impedance to the mutual impedance between the source and the detector coils. The magnitude of the conductivity coupling impedance is a function of the square of the frequency.

The presence of a ferrous metal object in the field around the source coil creates an antisymmetry in the magnetic permeabilities. This nonsymmetrical distribution of the magnetic permeabilities contributes permeability coupling impedance to the mutual impedance between the source and the detector coils. The magnitude of the permeability coupling impedance is a function of the first power of the frequency.

Prior underwater metal locators have employed a phase sensitive detector circuit to discriminate against the unwanted conductivity coupling impedance resulting from the conductivity antisymmetry. Since the presence of a ferrous metal object produces a change in the permeability coupling impedance, which is primarily an imaginary component of the mutual impedance, the phase sensitive detector circuit is arranged to respond fully to the imaginary component and to discriminate against the real component. However, in practice the conductivity coupling impedance is found to have substantial imaginary components as well as real components, and such an arrangement of the phase sensitive detector discriminates against only one of its components.

Accordingly, it is the principal object of this invention to provide a novel detecting apparatus of the mutual inductance type which is capable of locating a ferrous metal object buried a substantial distance below the floor of a body of water.

A further object of this invention is to provide a unique detecting apparatus of the mutual inductance type which may be towed behind a boat so as to search the floor of a body of water for buried pipelines and the like.

A still further object of this invention is to provide a detecting apparatus of the mutual inductance type having a probe member which incorporates novel means for mechanically and electrically balancing the coupling between the two coils.

The above objects and advantages of this invention are achieved by providing a mutual inductance type of detector housed in an elongated cylindrical housing which may be towed behind a boat or the like to search the floor of the body of water for the presence of ferrous metal objects. In order to provide the required sensitivity for detecting ferrous metal objects buried a substantial distance in the floor of the body of water, the detector is provided with a source coil and a detector coil of a relatively massive size containing a substantial amount of copper. The source coil is energized from a high powered oscillator which is capable of supplying at least ten watts of power to the source coil at a frequency of 10 to 50 cycles per second. By employing this low frequency range the effects of the conductivity coupling impedance discussed above is reduced without seriously effecting the permeability coupling impedance. The voltage signal induced in the detector coil is coupled to a preamplifier mounted in the same housing with the source coil and detector coil, which preamplifier in turn supplies an amplifier signal to the equipment located in the boat. The surface equipment consists of an amplifier for further amplifying the voltage signal, an electrical filter to reduce the noise and harmonic content, and a full wave rectifying bridge for supplying a rectified signal to a chart recording instrument for continuously recording the amplitude of the voltage signal induced in the detector coil. The elongated cylindrical housing is provided with means such as stabilizing fins to insure that the housing is always properly aligned with the floor of the body of water as it is towed by the boat. In addition, means are provided for the adjusting of the angular relationship between the source coil and the detector coil in order to reduce the coupling between the two coils to a minimum value.

Since there is a limit to the precision with which the mechanical adjustment of the coils can be made, and a limit to the stability of their angular relationship after the adjustment has been made, means are provided in the surface gear for electrically nulling out the first decade of response above the threshold of usable sensitivity. The magnitude of the signals involved can be expressed in terms of departure of the coil geometry from the perpendicular condition required to produce the same value of signal. In these terms a four inch pipe at a six foot range produces a signal equivalent to a 25 microradian coil tilt. The effect of the ocean conductivity usually amounts to a 10 microradian coil tilt while the mechanical instability often is in the order of a 10 microradian drift in five minutes. In order to assure that the signal from the pipe produces a detectable signal an electrical nulling circuit is provided in the surface equipment. The nulling circuit is adjusted until it substantially compensates for any misalignment of the source coil and detector coil.

The above objects will be better understood from the following detailed description of the preferred embodiment when taken in conjunction with the attached drawings in which:

FIGURE 1 is a longitudinal section of the subsurface instrument with the surface equipment shown schematically;

FIGURE 2 is a top view of a subsurface instrument or fish;

FIGURE 3 is a front view of the subsurface instrument;

FIGURE 4 is a side view of a modified fish;

FIGURE 5 is a vertical section taken along line 5—5 of FIGURE 4; and

FIGURES 6 and 6A are schematic drawings of the complete electronic circuit of both the subsurface and surface instrument.

Figure 6A:
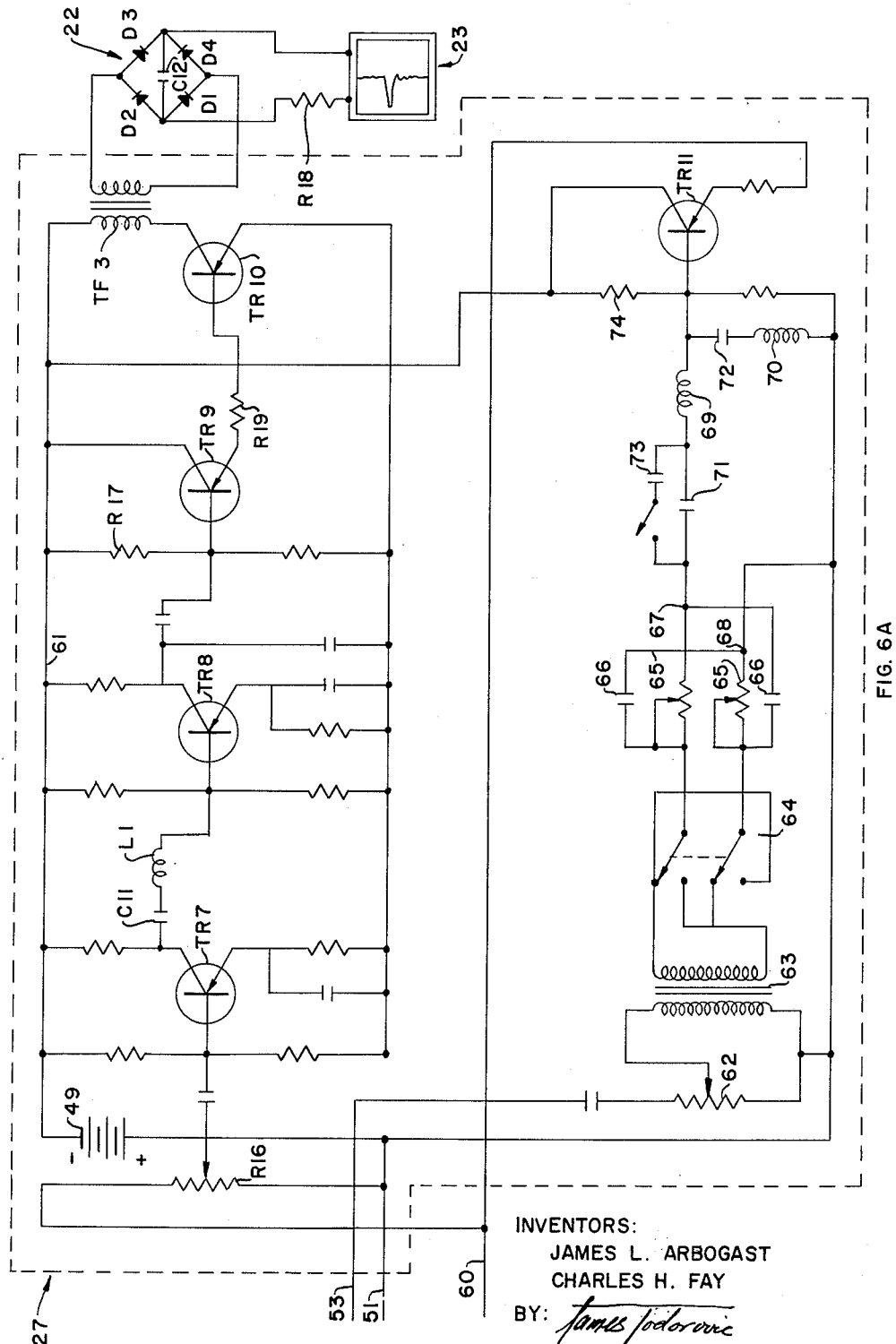

Referring now to FIGURE 1 there is shown an elongated tubular housing 10 which forms the subsurface probe or fish as it is called. A source coil 11 is mounted in the forward or nose section of the fish while a detector coil 12 is mounted in the rear of the fish. It should be noted that the source coil and detector coil are mounted at approximately right angles to each other and a means is provided for mechanically adjusting the angular position of the source coil 11 over a limited range to change the angular relationship between the two coils. The source coil 11 is supplied with a low frequency alternating current from a power oscillator 14 by means of a lead 13 with power oscillator 14 being coupled to a power supply 15. The voltage signal which is generated in the detector coil 12 is coupled to a preamplifier 16 mounted in the rear portion of the fish. The output signal from the preamplifier is coupled to an amplifier 21 at the surface by means of a lead 20 with the output signal from the amplifier 21 being rectified by a bridge circuit 22 and supplied to a continuous chart recorder 23.

From the above description it can be appreciated that if the fish is towed along the floor of a body of water and the source coil 12 energized from the oscillator 14 any ferrous metal object will distort the electromagnetic field produced by the source coil. When the electromagnetic field is distorted it will induce a change in the voltage in the detector coil which will be amplified, rectified and recorded on the chart recorder. By continuously recording the voltage signal from the detector coil it is possible to make numerous passes over a particular spot with the fish in order to accurately locate any ferrous metal objects and in addition gain an indication of the burial depth of the object which can be judged from the character of the response.

The housing of the fish 10 is formed from an elongated non-ferrous metal tube 30 which is closed at both ends and provided with a streamlined shape. Suitable steps should be taken to insure that the housing is watertight or that the electrical equipment is properly protected. A transverse bulkhead 31 is secured to the inner surface of the tubular member 30 adjacent the front end. A mandrel 24 is secured to the bulkhead 31 and projects to the left through the bulkhead 31 with the axis of the mandrel being aligned with the axis of the tube 30. A coil form insert 26 slips over the mandrel 24 and has a tubular shaft portion 28 which projects from a circular wedge shaped head portion 27. The source coil 11 is wound on a coil form 33 having a central opening 29 whose axis is inclined at an angle to the plane of the source coil. The source coil slips over the tubular shaft 28 of the coil form insert 26 and is held in place by a wedge shaped washer 34 and a bolt 35 which threads into the end of the stub shaft 25 of the mandrel 24. The detector coil 12 is wound on a coil form 37 which is securely fastened to the tubular member 30 by means of spacers 36 and opposed bolts 40 which pass through the tubular member and thread into the coil form 37. The detector coil 12 is mounted so that the axis of the coil is substantially perpendicular to the longitudinal axis of the tubular member 30.

The fish is stabilized by two outwardly projecting tubular members 41 so that when it is towed the axis of the detector coil will be perpendicular to the floor of the body of water. The members 41 have open outer ends and project outwardly and backwardly from the forward portion of the fish. The bottom portions of both of the members 41 are weighted by means of lead weights or the like to insure that the fish arrives on the ocean floor in an upright position. When the fish is properly positioned it can be easily towed by a boat over the surface of the floor of the body of water without danger of its rotating or assuming any other position than that position in which it was lowered. It should be noted that the above construction of the fish also provides a simple means by which the angular relationship between the axis of the source coil and the detector coil may be easily varied over a narrow range. In order to vary the angular relationship between the two coils it is only necessary to rotate the source coil 11 together with the coil insert 26. This will permit one to vary the projection in the vertical plane of the angular relationship between the axis of the source and detector coils over the narrow angle between the axis of the source coil and the axis of the stub shaft on the mandrel 24. This angular relationship is increased in FIGURE 1 in order to emphasize the fact that one may adjust the source coil 11 to obtain minimum coupling between the two coils. The source coil 11 should be adjusted until it is substantially perpendicular to the axis of the detector coil since the assembly is more sensitive in the direction of the detector coil axis, thus facilitating the finding of objects buried in the ocean floor.

There is shown in FIGURES 4 and 5 a modified form of the subsurface fish described above. The modified fish utilizes a light non-ferrous tubular body 45 without stabilizing fins. While the body is generally cylindrical it is provided with a flat side 46 which forms the bottom surface of the fish. In order to stabilize the fish the source coil 11 is mounted in a watertight container 47 which is secured to the flat side 46 of the body 45. The detector coil 12 and preamplifier 16 are placed in a similar watertight container 48 which is secured to the flat side 46 adjacent the rear portion of the fish. A buoyancy member 49 is mounted in the top portion of the tubular body 45 and may be formed by an enclosed air chamber or a solid material such as wood or the like. The tubular body 45 should be provided with sufficient openings in order that it may be completely filled with water as the fish sinks to the ocean floor.

From the above description it can be seen that the center of gravity of the fish shown in FIGURES 4 and 5 is below the geometric center of the tubular body 45 while the center of buoyancy is above it. Thus the fish will always assume a position in which the flat side 46 rests on the ocean floor. The flat side 46 will increase the stability of the fish particularly when it is towed over the ocean floor.

Referring now to FIGURES 6 and 6A there is shown the power oscillator 14, preamplifier 16 and amplifier 21 circuits as well as the bridge rectifier 22 and chart recorder 23. All of the circuits use transistors in order to increase the reliability of the apparatus and its ability to withstand physical abuse as well as to decrease the power requirements. The power oscillator 14 utilizes three transistors TR–1, TR–2, and TR–3 with TR–2 and TR–3 being disposed in a push-pull relationship to amplify the oscillating current derived from TR–1. All three of the transistors are supplied from a battery 47 which is part of the power supply 15 shown in FIGURE 1 through two leads or buses 50 and 51 which are connected to the negative and positive sides of the battery 47, respectively. The positive side of the battery is grounded while the negative side is used to power the transistors as is well known in the use of PNP transistors. It should be noted that the voltage appearing on the collector of TR–2 is fed back to the base of TR–1 through a phase shifting network consisting of capacitors C–1 and C–2 and resistances R–1 and R–2 by means of a lead 52. This phase shifting network is designed so that it will shift the phase of the voltage appearing on the collector of TR–2 90 degrees when the voltage is oscillating at 25 cycles per second. TR–1 will then shift the voltage 180 degrees when it is amplified and TF–2 will shift the voltage another 270 degrees before it is supplied to the base of TR–2. TR–2 will add another 180 degrees phase shift as the voltage is amplified and thus the voltage appearing on the collector of TR–2 will be in phase with the original voltage applied to the phase shifting network if the circuit is oscillating at 25 cycles per second. Thus the circuit will supply an oscillating current to the remainder of the instrument having a fixed frequency of 25 cycles per second. While 25 cycles per second is the preferred operating frequency the apparatus will also operate satisfactorily over a frequency range of 10 to 50 cycles per second which may be obtained by varying the values of C–1, C–2, and R–1, R–2 and capacitors C–7, C–10 and C–11 in the preamplifier 40 described below. As was explained in the introduction, a low frequency is desirable to reduce the effect of the non-symmetrical conductivity of the medium surrounding the fish as it is towed over the ocean floor. While a low frequency is desirable there are practical limitations to the lowering of the frequency since a lower frequency drastically reduces the efficiency of both the source coil and detector coil.

The bias current for TR–1 is obtained from the negative bus 50 through a resistance R–3 while the collector of TR–1 is connected to the base of the transistor TR–2 and TR–3 through transformers TF–1 and TF–2. The other ends of the series connected primaries of TF–1 and TF–2 are connected directly to the bus 50. The two secondaries of the transformers TR–1 and TF–2 are connected together through a capacitor C–3 in order to bypass all frequencies other than the direct current. The bias current for TR–3 is obtained from the bus 50 through a resistance R–4 and the secondary of TF–1 while the bias current of TR–2 is obtained from the bus 50 through a resistance R–5 and the secondary of transformer TF–2. The secondaries of the two transformers TF–1 and TF–2 should be connected together in such a way that the bases of the transistors TR–2 and TR–3 are driven 180 degrees out of phase with respect to each other. It is necessary to use separate bias resistors for TR–2 and TR–3 in order to maintain equal bias currents on TR–2 and TR–3 when they have unequal base resistances. The collector current from the power stage consisting of TR–2 and TR–3 is supplied to the source coil in the fish through two leads 53 and 54.

The resonance of the source coil at 25 cycles is insured by means of two capacitors C–4 and C–5 which are connected in parallel with the source coil. The use of the two capacitors C–4 and C–5 helps to reduce the power loss in the cable connecting the power oscillator which is disposed at the surface with the source coil which is disposed in the fish. The two leads 53 and 54 are connected to opposite ends of the source coil with direct current power for the oscillator being supplied by a center tap which is connected to the negative side of the battery 47 by means of a lead 55.

The voltage signal induced in detector coil 12 is amplified by a preamplifier mounted in the tail of the fish, which employs three transistors TR–4, TR–5 and TR–6. The voltage signal from the detector coil 12 is coupled directly to the base of the transistor TR–4 with a capacitor C–7 being connected in parallel with the detector coil in order to provide a means for insuring that the detector coil will resonate at 25 cycles per second. The biasing current for the base of TR–4 is supplied from a bus 56 which is connected to the negative side of a second battery 48 mounted at the surface through the resistance network R–7 and R–11 and the direct current resistance of the detector coil 12. While the complete instrument may be operated from a single battery or other power supply it is preferred to use a separate battery for the power supply of each amplifier of the instrument in order to reduce the feedback from the last stage to the first or second stage through the common power supply impedance. A voltage divider consisting of R–8 and R–9 is disposed between the bus 56 and a ground bus 57 in order to maintain a low voltage between the collector and base of the transistor TR–4. This low collector voltage is required in order to reduce the noise generated in the transistor TR–4. A resistor R–10 is disposed in series with the parallel combination of resistors R–9 and R–8, and the total combination forms the load for the collector of TR–4 which is coupled to the base of the transistor TR–5 through a capacitor C–9. The emitter of the transistor TR–4 is connected to the ground bus 57 through a resistance R–12 while a capacitor C–8 is disposed in parallel with the resistance R–12 in order to prevent degeneration of the alternating current signal while R–12 effectively degenerates the direct current, thus the combination R–7, R–11 and R–12 effectively stabilizes TR–4 for direct current. One stage of filtering for unwanted high frequency noise is provided by a capacitor C–10 which is disposed between the collector of the transistor TR–4 and the ground bus 57. This capacitor effectively shunts any high frequency signals which are passed by TR–4 directly to ground. The remaining two transistors TR–5 and TR–6 of the preamplifier are coupled to the power supply 56 and the ground bus 57 in exactly the same manner as described for the transistor TR–4. The only difference between the last two stages and the first stage of the preamplifier is that no direct current voltage is required on the collector of these two stages in order to reduce the noise level and accordingly the collectors of the last two stages are connected directly to suitable load resistors R–15 which in turn are connected to the power bus 56. The output signal from the final stage TR–6 of the preamplifier is connected to a gain control resistor R–16 in the surface amplifier by means of a lead 69.

Referring now to FIGURE 6A there is shown the surface nulling circuit as well as the amplifier 21, rectifier 22 and chart recorder 23. The nulling circuit provides a voltage having a variable amplitude and phase which is added to the voltage signal from the preamplifier 16 to cancel the effect of misaligned coils, changes in ocean conductivity and the like. The nulling circuit derives a voltage from the power oscillator 14 through lead 53 and ground lead 51. The magnitude of this voltage is controlled by a potentiometer 62 disposed across the leads 51 and 53. The voltage signal is supplied to the primary of the transformer 63 whose secondary is connected to a phase reversing switch 64. The phase reversing switch 64 provides a 180 degree phase reversal when desired. The voltage from the phase reversing switch 64 is coupled to two potentiometers 65 and two capacitors 66 which together form a phase shifting network. Thus the voltage signal at the points 67 and 68 will have a constant value but can be varied continuously in phase between 0 degrees and approximately 180 degrees.

The point 68 is grounded while the point 67 is coupled to a double filter circuit form by the inductances 69 and 70 and capacitors 71 and 72. An additional capacitor 73 is disposed in parallel with the capacitor 71 to supply an additional phase shift if desired. The double filter circuit is designed to freely pass the 25 cycle signal of the power oscillator but discriminates against all others particularly the second harmonic of 25 cycles.

The output of the double filter circuit is coupled to the base of a transistor TR11 which is disposed in a cathode follower arrangement to prevent the low impedance load of the preamplifier and amplifier from being a load on the nulling circuit. The negative bias for the base of transistor TR11 is obtained from the power bus 61 through a resistance 74 while the emitter of TR11 is coupled to the lead 60 from the preamplifier 16.

From the above description it can be seen that the nulling circuit will supply a voltage signal which may be added to the signal from the preamplifier 16. Both the amplitude and phase of the signal from the nulling circuit may be varied in order to cancel the undesired portion of the signal from the preamplifier 16. While only one type of nulling circuit has been described other electrical or magnetic circuits may be devised to supply the same type of output signal. Also this function could be accomplished by a circuit disposed in the fish and remotely controlled from the surface.

The surface amplifier 21 consists of four stages each formed by a transistor TR-7, TR-8, TR-9 and TR-10, respectively. The transistors of the first two stages of the surface amplifier are connected in exactly the same way as the three stages of the preamplifier in the fish. A battery 49 whose negative side is connected to a power bus 61 is used for powering the surface amplifier for the same reasons as set out above for batteries 47 and 48. The first stage transistor TR-7 is connected to the second stage TR-8 through a filtering circuit consisting of a capacitor C-11 and inductor L-1 in order to reduce all unwanted frequencies which are transmitted from the preamplifier. The last two stages of the surface amplifier are directly connected through a resistance R-19 since the bias current required by the last stage TR-10 is substantially the same as the current required for the collector of the third stage TR-9. The collector of the fourth stage TR-10 is coupled to the bridge circuit through a transformer TF-3.

The bridge rectifying circuit 22 performs the function of full wave rectification of the 25 cycle current supplied by the preamplifier and amplifier sections. The bridge rectifying circuit utilizes four diodes D-1, D-2, D-3 and D-4, preferably of the crystal type, and a capacitor C-12 is disposed across the opposite corners of the bridge in order to bypass unwanted alternating current signals. The opposite corners of the bridge are also connected to a continuous chart recorder 23 through a resistance R-18 in order to prevent over dampening of the recording galvanometer used in most continuous chart recorders. The use of a continuous chart recorder is an important feature of this invention since it permits one to discriminate between useful signals and unwanted noise, and response to shallow buried miscellaneous small pieces of metal. The character of the signal of the chart recorder may also be used to indicate the burial depth of the object.

The above-described electronic circuit thus provides a simple means by which a relatively low frequency high powered alternating current may be generated and coupled to the source coil 11 of the fish 10 shown in FIGURE 1. The circuit also provides a means for amplifying the voltage signal generated in the detector coil 12 when the fish passes in close proximity to a ferrous metal object and supplies the amplified signal to the surface amplifier. A nulling circuit is included in the amplifier in order to accurately compensate for any slight mechanical misalignment of the source coil 11 and detector coil 12 and other effects. The surface amplifier in turn further amplifies the signal, filters it and supplies it to a rectifying bridge where the signal is converted into a proportional direct current signal. Finally, the direct current is supplied to a continuous chart recorder in order that a continuous record may be maintained of the voltage induced in the detector coil 12.

When the above-described apparatus is operated the surface equipment is connected to the source in the fish through a cable having sufficient conductors to connect the various portions of the apparatus as well as sufficient physical strength to permit the fish to be dragged along the floor of the ocean. The fish is dragged slowly over the ocean floor and the voltage represented by the height of the chart record on the recorder 23 is observed to detect any changes from the normal noise level. An increase in the magnitude of the voltage recorder indicates the presence of a ferrous metal object. In order to accurately locate the object it is sometimes necessary to move the fish back and forth across the approximate location until the exact position of the maximum increase in the magnitude of the voltage is determined. This position indicates the location of the ferrous metal body and in case of a pipeline buried several feet below the surface of the ocean floor it is sometime necessary to lower a diver with a probing member to confirm the location or secure a cable to the pipeline.

When it is desired to locate equipment dropped from a drilling rig all that is necessary is to drag the fish along the side of the drilling rig at the approximate location where the equipment was dropped. When the approximate location of the equipment is detected its exact location can be detected by the location at which maximum voltage is recorded on the chart recorder.

While only one particular embodiment of this invention has been described in detail it is susceptible to many modifications and improvements without departing from its broad spirit and scope.

We claim as our invention:

A device for locating ferrous metal objects submerged below the surface of a body of water comprising: an elongated housing having a pair of coils mounted therein, said coils being mounted at right angles to each other, means for mechanically adjusting the position of at least one of said coils to position said one coil in a perpendicular relation to the other of said coils; a source of low frequency alternating current connected to one of said coils, said source having a frequency of between 10 and 50 cycles per second and a power of at least 10 watts, the signal induced in said other coil when said elongated housing passes in proximity to a metallic object being coupled to an indicating means; a nulling circuit for generating a signal to compensate for misalignment of said coils, said nulling circuit including a first means for adjusting the amplitude of a signal supplied to the nulling circuit by said source of low frequency alternating current and a second means for shifting the phase of the signal supplied to said nulling circuit; an impedance matching device for combining the signal from said nulling circuit with the signal from said other coil and indicating means for indicating the amplitude of the combined signal.

References Cited in the file of this patent

UNITED STATES PATENTS

| | | |
|---|---|---|
| 2,238,072 | Nelson et al. | Apr. 15, 1941 |
| 2,242,312 | Machts | May 20, 1941 |
| 2,447,316 | Curtis | Aug. 17, 1948 |
| 2,723,374 | Williams | Nov. 8, 1955 |
| 2,744,232 | Shawhan et al. | May 1, 1956 |
| 2,788,483 | Doll | Apr. 9, 1957 |
| 2,872,638 | Jones | Feb. 3, 1959 |
| 2,887,650 | Ruddock | May 19, 1959 |
| 3,020,470 | Shawhan et al. | Feb. 6, 1962 |